Oct. 1, 1963  L. PÉRAS  3,105,757
METHOD AND APPARATUS FOR THE PREPARATION OF FERROUS OXIDE
Filed March 10, 1961

Inventor
Lucien Péras
By Stevens Davis Miller & Mosher
Attorneys

Oct. 1, 1963 L. PÉRAS 3,105,757
METHOD AND APPARATUS FOR THE PREPARATION OF FERROUS OXIDE
Filed March 10, 1961 2 Sheets-Sheet 2
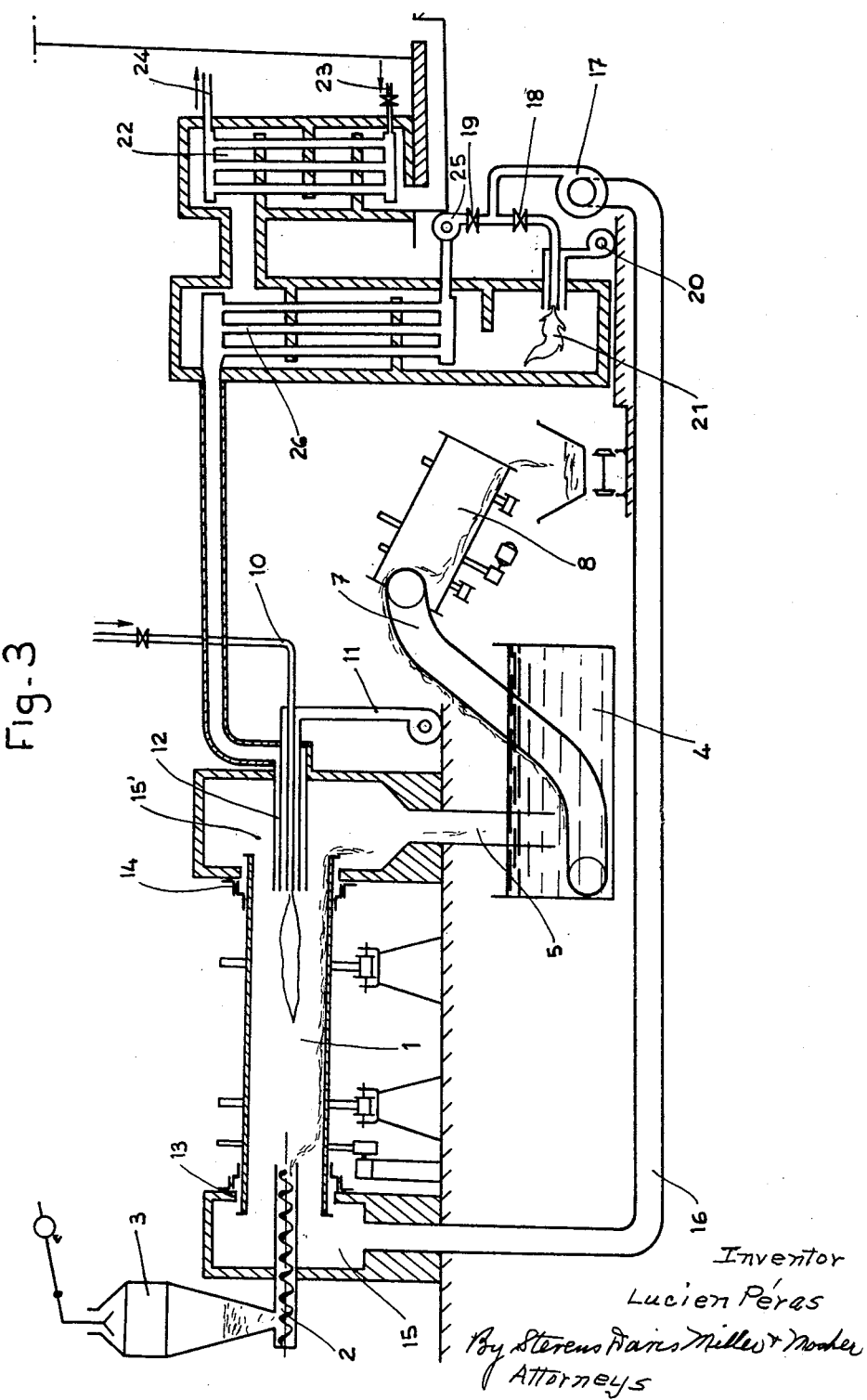

United States Patent Office 3,105,757
Patented Oct. 1, 1963

3,105,757
METHOD AND APPARATUS FOR THE PREPARATION OF FERROUS OXIDE
Lucien Péras, Billancourt, France, assignor to Regie Nationale des Usines Renault, Billancourt, France
Filed Mar. 10, 1961, Ser. No. 94,878
Claims priority, application France Mar. 11, 1960
6 Claims. (Cl. 75—1)

The present invention has for its object a new industrial method of preparation of ferrous oxide FeO from ores rich in iron such as siderite, $FeCO_3$, magnetite, $Fe_3O_4$, hematite, $Fe_2O_3$. This method offers the possibility of being employed on a very large scale and under particularly economical conditions.

It is known that, according to the Chaudron diagrams given in FIGS. 1 and 2, that the monoxide FeO is stable at high temperature in a large field of concentration of CO and $CO_2$ or of $H_2$ and $H_2O$. Such atmospheres are however very expensive to prepare and constitute a waste of energy, so that they could not be utilized on an industrial scale up to the present time.

The method according to the invention contemplates a method of preparation of ferrous oxide permitting atmospheres of this kind to be employed economically, the method being mainly characterized in that the heating gases and the gases of the reducing atmosphere are obtained by means of a single flow of hydrocarbon gases.

To this end, use can advantageously be made of natural gas rich in methane.

More particularly, in accordance with this process, the iron ore is reduced in a rotary furnace, this furnace being heated by an axial burner supplied with natural gas and primary air in proportions of incomplete combustion, resulting in an atmosphere in equilibrium in the ferrous oxide in the hot zone of the furnace, a portion of the combustion gases being recycled and fed back into the burner.

The invention has also for its object the apparatus necessary for carrying this process into effect.

Further special features and advantages of the invention will be brought out from the description which is given below, reference being made to the accompanying drawings, in which:

FIG. 3 is a diagrammatic view in elevation of an installation for carrying into effect the method according to the invention.

Figure 1:
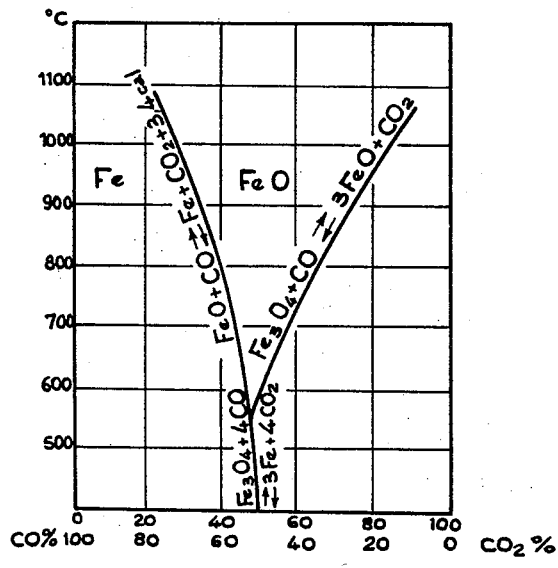
FIGS. 1 and 2 are chaudron diagrams.
Figure 2:
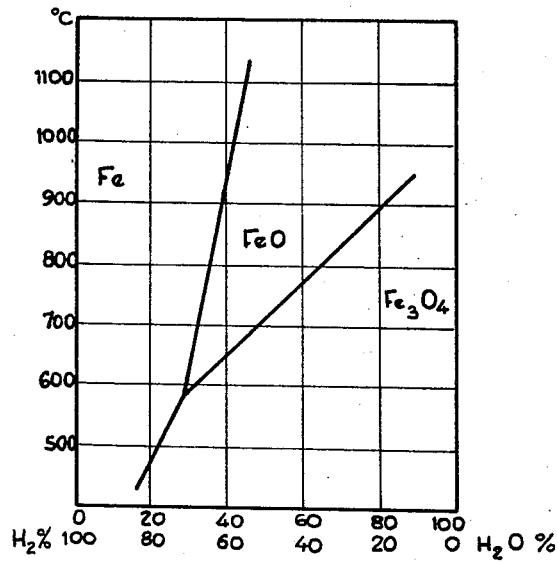

Referring to FIG. 3, it can be seen that the main apparatus is a rotary furnace 1 with an axial burner, very similar to those employed in the cement industry. The iron ore, constituted for example by a hematite rich in iron, such as Ouenza ore, is charged cold at the upper extremity of the furnace; it passes out at the lower extremity in the form of monoxide at a temperature higher than 650° C. and is soaked with water. This soaking with water is necessary to prevent decomposition of the monoxide.

The ore is charged into the furnace in the form of small pieces from a few millimetres to a few centimetres in diameter. The feed is carried out by any conventional method: inclined spout, platform, or more conveniently by a screw 2 from a hopper 3, as shown in the drawing, since the gas which passes out of the furnace must be isolated from contact with air. The ore, reduced to the state of hot monoxide is poured into the soaking tank 4 through a submerged shoot 5. The water is hot, and a chain of buckets 7 or an endless apron removes the oxide at a temperature in the vicinity of 100° C. and discharges it on to a rotary screen 8, in which it dries instantaneously without any necessity for supplementary heat.

The temperature of the furnace on the burner side is of the order of 1,000° C., which is sufficiently high to carry out the reduction rapidly, without however being high enough to involve risk of scorification of the gangue of the ore. The temperature of the gas at the extremity where the ore is charged in the cold state is of the order of 180° C.

The burner which heats the furnace is placed at the lower extremity in the axis of the furnace as in cement furnaces. It is essentially composed of three coaxial tubes; natural gas and air are fed respectively into the two inner tubes 10 and 11. It is of little importance which of these gases is fed in through the innermost axial tube, provided however that the sections remain approximately in the ratio of the rates of flow of gas, which will be indicated later. The peripheral tube 12 serves for feeding the gas which has been recycled from the furnace.

At each extremity of the tubular rotary furnace are provided rotary joints 13 and 14 which ensure gas-tightness of the end chambers 15 and 15', without communication with the exterior air. To this end, the shoot 5 which extracts the monoxide from the furnace dips into the soaking tank 4.

The primary air is fed to the axial burner of the rotary furnace in insufficient quantity for complete combustion, so that the combustion gas may have a reducing action on the ore to be converted to monoxide.

A current composition for the gas after combustion is as follows:

| | Percent |
|---|---|
| $H_2$ | 21.2 |
| CO | 7.5 |
| $H_2O$ | 7.2 |
| $CO_2$ | 7.0 |
| $N_2$ | 57.1 |

In practice, there should be obtained 4 to 20% of CO, 8 to 30% of $H_2$, the remainder being $CO_2$ $H_2O$ and $N_2$.

The gas which escapes from the rotary furnace through the gas-tight chamber 15 and the conduit system 16 is drawn-in by the fan 17 and is divided into two substantially equal portions by valves 18 and 19. To one portion is added secondary air supplied by a fan 20 and the mixture is completely burnt in the hearth of a heat-recuperator 21, brought up to a temperature higher than 1,000° C. The flames from this hearth pass along tubes of refractory stainless steel in the recuperator, and the products of combustion pass out at a moderate temperature of the order of 460° C. From the recuperator, the gases are passed to the chimney, either directly or better, after having passed through an economizer 22 which heats the water fed in through the piping system 23 and passing out hot through the pipe 24.

The other portion of the gas, representing approximately 50%, is drawn-in by a fan 25 and forced through the refractory tubes 26 of the exchanger in which this gas is heated to a temperature of the order of 760° C. This hot gas is sent into the peripheral sheath 12 of the burner and it constitutes a screen against sudden increases in heat and the risk of scorification by the axial primary flame of the rotary furnace, so that the furnace is uniformly brought up to 1,000° C. on this side.

The material balance sheet of the operation is established as follows: for one ton of hematite ore rich in $Fe_2O_3$ treated per hour, the consumption of natural gas rich in methane is about 115 cubic metres. The quantity of monoxide produced is 900 kgs. per hour. The primary air at the burner of the rotary furnace represents 575 cu. m. per hour and the secondary air at the hearth of the recuperator 225 cu. m. per hour.

The thermal efficiency is excellent, since it would correspond to 218 kgs. of metallurgical coke per ton of iron employed and since, in addition, it utilizes natural gas, to the exclusion of special and rare fuels.

Using the same principle, it would be possible to construct units having a much higher production capacity, for example of the order of 200 to 800 tons per 24 hours.

Without the soaking operation, a partial or total decomposition of the monoxide is obtained in an intimate mixture of iron and magnetite, but it is only necessary to heat this product in the field of stability of the ferrous oxide for the latter to be re-formed instantaneously, so that there would be no serious objection to replacing the soaking by a slow cooling while recovering the heat, in accordance with usual practice.

The same method is also applied to the case where the natural gas rich in methane is replaced by cracking gas or a hydrocarbon or a mixture of gaseous or liquid hydrocarbons.

The temperatures indicated are given by way of indication in order to illustrate a concrete case. The principle may be respected with working adjustments giving somewhat different values.

As an alternative form of the method, the hot re-cycled gas may be partly or wholly mixed with the natural gas of the primary burner of the rotary furnace.

I claim:

1. The method for preparing FeO from ores of higher oxides of iron which comprises reacting a methane-rich gas in a combustion zone with primary air in proportions for incomplete combustion thereby producing a first reducing gas stream comprising CO, mixing said first stream with a second gas stream also comprising CO, said second stream being at a temperature such that the temperature of the combustion zone is approximatley 1000° C., passing the resulting mixture of hot gases comprising CO counter-current to and in contact with an advancing stream of said ore of higher oxides of iron in a reducing zone thereby reducing said higher oxides of iron to FeO, withdrawing gaseous effluent from said reducing zone, dividing said effluent into two approximately equal portions, burning one of said portions completely with secondary air in recuperative heat exchange with the other said portion, recycling the thus-heated second portion to said combustion zone as said second gas stream and discharging the treated ore comprising FeO from said reducing zone.

2. The method as set forth in claim 1 in which the methane-rich gas is natural gas.

3. The method as set forth in claim 1 in which the treated ore is discharged beneath a body of water, thereby quenching said ore and preventing reoxidation of the FeO.

4. Apparatus for treating iron ores with reducing gases which comprises a rotary furnace, means to feed ore to said furnace at one end thereof, means to discharge treated ore from said furnace at the opposite end thereof, means adjacent said discharge means to heat said furnace and to supply, simultaneously a reducing gas thereto, said means comprising a burner having first and second concentric tubular conduits therein, means for supplying gas to one of said conduits and combustion air to the other said conduit, a third concentric conduit surrounding said first and second conduit and means to recycle gases discharged from said furnace to said third conduit.

5. Apparatus as claimed in claim 4 including means for discharging gases from said furnace adjacent the means for feeding ore thereto and a recuperator for heating gases recycled to said third conduit.

6. Apparatus as claimed in claim 5 in which means are provided for recovering heat from the stack gases discharged from said recuperator.

References Cited in the file of this patent

UNITED STATES PATENTS

| | | |
|---|---|---|
| 803,886 | Ellis | Nov. 7, 1905 |
| 2,107,549 | Schmalfeldt | Feb. 8, 1938 |
| 2,747,988 | Von Haken | May 29, 1956 |
| 2,986,460 | Babcock | May 30, 1961 |